Patented Mar. 20, 1923.

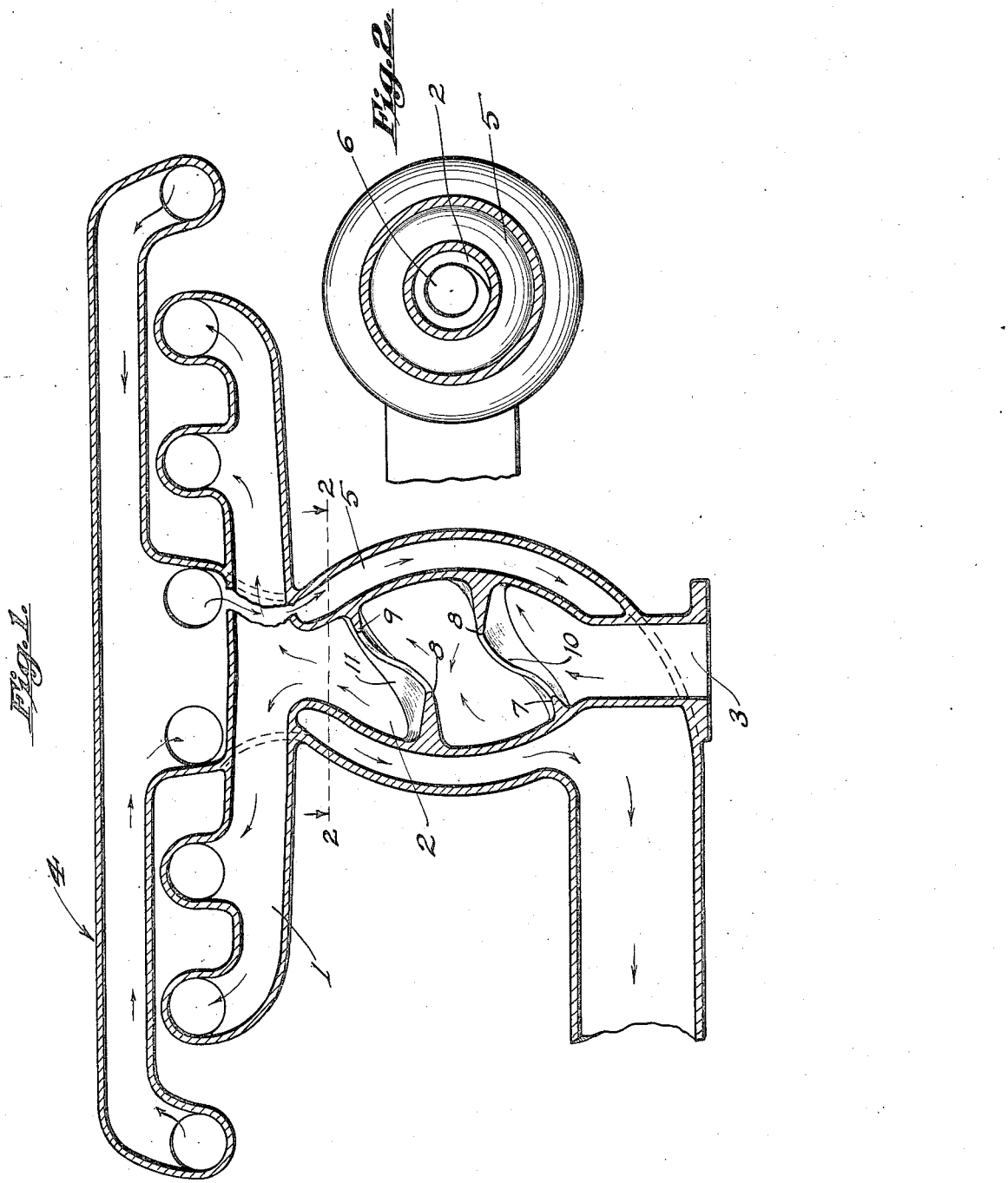

1,449,333

UNITED STATES PATENT OFFICE.

HAROLD S. LAMB, OF LOS ANGELES, CALIFORNIA, ASSIGNOR TO WILLIAM C. SCHEU, OF LOS ANGELES, CALIFORNIA.

MIXER.

Application filed April 7, 1920. Serial No. 372,053.

*To all whom it may concern:*

Be it known that I, HAROLD S. LAMB, a citizen of the United States, residing at Los Angeles, in the county of Los Angeles and State of California, have invented new and useful Improvements in Mixers, of which the following is a specification.

This invention is a mixer particularly adapted for use in connection with the combustible mixture supplied to an internal combustion engine.

It is a well known fact that if a whirling spiral motion is imparted to the flow of combustible mixture through the intake pipe of an internal combustion engine any globules of unvaporized liquid, held in suspension in the combustible mixture, will be thrown outwardly against the wall of the intake pipe to prevent the passage of such globules to the engine until they have been broken up and vaporized, and if the intake pipe is subject to heat such globules will be more readily vaporized.

It is the object of the invention to provide an improved device for setting up such a spiral whirling action by the use of which a more thorough breaking up of any globules of liquid, held in suspension in the combustible mixture, and more complete subsequent vaporization of such globules, may be accomplished than has been possible heretofore by the use of any of the known forms of such devices.

It is a further object of the invention to provide a device of this character so designed as to offer no appreciable impediment to the proper flow of the combustible mixture, but which will positively impede the passage of any globules of liquid held in suspension in the mixture and completely break up such liquid globules and cause thorough mixing thereof with the vaporous mixture to provide a homogeneous vaporous combustible mixture.

In the invention as illustrated in the accompanying drawings,

Figure 1 is a vertical section through the intake and exhaust pipes of an internal combustion engine with the mixer arranged in the intake pipe, Fig. 2 is a transverse section on the line 2—2 of Fig. 1.

In the drawings the intake manifold for an internal combustion engine is shown at 1 and is connected to the intake pipe 2 having the inlet end 3. The exhaust manifold of the engine is shown at 4 connected to an exhaust pipe 5 which surrounds the intake pipe 2. The portion of the intake pipe thus surrounded by the exhaust pipe is, preferably, curved outwardly from the respective ends of such incased portion to provide an intake pipe, the incased portion of which is of gradually increasing and subsequent decreasing cross sectional area. The portion of the exhaust pipe surrounding the intake pipe is, preferably, similarly curved to provide a space between the exhaust and intake pipes of uniform cross sectional area.

By the construction as thus described it will be seen that the hot exhaust gases from the engine will flow past the intake pipe 2 thereby heating the outwardly curved portion of the intake pipe. The improved mixer is arranged within this outwardly curved portion of the intake pipe so as to throw any globules of liquid passing through the intake pipe in suspension in the combustible mixture outwardly against the heated wall of the intake pipe to cause vaporization of such globules.

The mixer is shown as a flange extending inwardly from the wall of the intake pipe and, preferably, made integral with said intake pipe. This flange is shown as of spiral conformation and extending completely around the wall of the intake pipe, an axial aperture 6 being provided within the curvature of said spiral flange forming a passage for the combustible mixture extending through the intake pipe. The spiral flange is shown as starting at the point 7 at which point the flange is of relatively narrow width and as increasing in width to points of greatest width, as shown at 8, approximately midway of the length of the flange and as then decreasing in width toward the opposite end 9 of the flange.

By this arrangement it will be seen that a gradually increasing and subsequent decreasing obstructing area to the flow through the intake pipe is provided. Furthermore the flange of the mixer is, preferably, arranged, as shown at 10, at a gradually increasing inclination to the direction of flow indicated by the arrows through the intake pipe from its end 7 toward the points 8 midway of the length of the mixer at which points the flange is approximately at right angles to the flow through the intake pipe and is then, preferably, arranged at a gradually decreasing inclination, as shown at 11, to the direction of flow through the intake pipe toward its opposite end 9. By this arrangement an inclined obstructing surface to the flow through the intake pipe is provided which is of gradually increasing and subsequent decreasing inclination to the direction of flow.

The combustible mixture passing through the intake pipe will flow freely through the central opening 6, a whirling motion being given to the flowing mixture by the spiral baffle of the mixer, and any globules of suspended liquid in the mixture are thrown outwardly by centrifugal force against the wall of the intake pipe, and the passage through the intake pipe of such globules will be prevented by the baffle flange. The impact of the globules against the wall of the intake pipe will break up these globules and the heat of the intake pipe will cause vaporization of such globules and the complete mixture thereof with the combustible mixture to form a homogeneous vaporous combustible mixture.

It will be observed that due to the whirling action thus imparted to the flow of combustible mixture, the pressure of the flow through the center of the intake pipe and the central opening of the baffle flange will be less than the pressure of the portion of the whirling flow which is adjacent the wall of the intake pipe beneath the baffle flange, due to centrifgual force of the whirling flow which will be greatest at the most distant points from the axis thereof, that is at the wall of the intake pipe. Thus it will be seen that there will be a tendency to force the flowing mixture outwardly beneath the baffle flange and against the wall of the intake pipe for completely breaking up any globules of unvaporized fuel to cause complete vaporization thereof.

As clearly shown in the drawings, the device consists of a bulbous fuel chamber 2 diverging from the inlet 3 upwardly. The spiral flange projects inwardly from the wall of the chamber 2, and while providing a central unobstructed passageway for the upward flow of fuel, at the same time this spiral forms adjacent to the surface of the chamber 2 a spiral or helical path for the fuel. Therefore, that portion of the fuel which impinges upon the helical flange is given a rotary or whirling motion so that the fuel is thoroughly mixed before finally discharging from the outlet of the mixer.

Various changes may be made without departing from the spirit of the invention as claimed.

What is claimed is:

1. A mixer comprising a conduit having a central unobstructed passageway and a lateral, spiral baffle forming a spiral path at and along the wall of the mixer, the upper portion of the mixer chamber having a contracted throat in which the fluid mixture swirls as it leaves the passage and path, the conduit being of swelled form, said spiral baffle consisting of a web the width of which is greatest at the greatest diameter of the swelled portion of the conduit.

2. A mixer comprising a conduit, and a spiral baffle forming a passageway through the conduit and so constructed as to present an inclined obstructing surface to the flow through said passageway, the inclination of of said surface relative to the direction of flow decreasing from an intermediate portion towards its respective ends.

3. A mixer comprising a conduit, and a spiral baffle flange on the inner wall of said conduit and extending into the same to form an axial passageway, said flange decreasing in width and in the inclination thereof relative to the direction of flow through said passageway from an intermediate portion towards the respective ends of the baffle.

4. A mixer comprising a conduit of decreasing cross sectional area from an intermediate portion towards its respective ends, and a spiral baffle within said conduit and forming an axial passageway through the same, said baffle being so arranged as to offer decreasing obstruction to the flow through the passageway from an intermediate portion towards its respective ends.

5. A mixer comprising a conduit, and a spiral baffle flange extending completely around the inner wall of said conduit and forming an unobstructed axial passage through said conduit, said flange decreasing in width and in the inclination thereof relative to the direction of flow through said conduit from an intermediate portion towards the respective ends of the baffle.

In testimony whereof I have signed my name to this specification.

HAROLD S. LAMB.